United States Patent [19]

Robert

[11] Patent Number: 5,421,784
[45] Date of Patent: Jun. 6, 1995

[54] DRIVEN PULLEY WITH FLYWEIGHTS EFFECTIVE AT LOW SPEEDS

[75] Inventor: Jean Robert, Drummondville, Canada

[73] Assignee: Powerbloc IBC Canada Inc., Drummondville, Canada

[21] Appl. No.: 280,018

[22] Filed: Jul. 25, 1994

Related U.S. Application Data

[63] Continuation-in-part of Ser. No. 84,284, Jun. 28, 1993, Pat. No. 5,358,450.

[51] Int. Cl.⁶ .............................................. F16H 59/00
[52] U.S. Cl. ................................................... 474/13
[58] Field of Search .............................. 474/8, 11–16, 474/69, 70

[56] References Cited

U.S. PATENT DOCUMENTS

| | | |
|---|---|---|
| 3,266,330 | 8/1966 | Galleher . |
| 3,638,744 | 2/1972 | Washizawa . |
| 4,284,408 | 8/1981 | Boer et al. . |
| 4,464,144 | 8/1984 | Kobayashi . |
| 4,575,363 | 3/1986 | Burgess et al. . |
| 4,634,405 | 1/1987 | Quick et al. . |
| 4,826,467 | 5/1989 | Reese et al. . |
| 5,326,330 | 7/1994 | Bostelmann ..................... 474/13 |
| 5,328,413 | 7/1994 | Robert . |
| 5,358,450 | 10/1994 | Robert . |

FOREIGN PATENT DOCUMENTS 0110056   5/1987   Japan ........................ 474/13

*Primary Examiner*—Michael Powell Buiz
*Attorney, Agent, or Firm*—Merchant & Gould; Smith, Edell, Welter & Schmidt

[57] ABSTRACT

In a driven pulley used in a variable speed transmission adapted to receive a trapezoidal belt by which power is transmitted from a driving pulley to the driven pulley having a fixed flange, a movable flange and an internal helicoidal spring, there is provided a set of flyweights forced by torsion springs on a conical ring located at the rear of the movable flange. At the minimum rotation speed, the driven pulley generates a high gripping force but as the rotation speed increases, the centrifugal force acting on the flyweights lowers the force exerted by the trapezoidal belt. At a given high rotation speed, the flyweights leave the conical ring and no longer contribute to counterbalancing the radial force exerted by the trapezoidal belt, the helicoidal spring and the internal resultant forces acting alone. The improved driven pulley generates a high initial gripping force while having a reasonably low gripping force at high speed for good efficiency.

12 Claims, 4 Drawing Sheets

DRIVEN PULLEY WITH FLYWEIGHTS EFFECTIVE AT LOW SPEEDS

RELATED APPLICATION

The present application is a continuation-in-part of the application Ser. No. 08/084,284 filed on Jun. 28, 1993, now U.S. Pat. No. 5,358,450.

FIELD OF THE INVENTION

The present invention relates to a driven pulley used in a variable speed transmission adapted to receive a trapezoidal belt by which power is transmitted from a driving pulley to the driven pulley.

BACKGROUND OF THE INVENTION

Trapezoidal belt variable speed transmissions are commonly used on small vehicles such as snowmobiles, scooters or small cars. Such transmissions comprise a driving pulley, a trapezoidal belt and a driven pulley. The driving pulley is linked to an engine and the driven pulley is usually mechanically connected to ground traction means, such as wheels or tracks.

The main object of using a variable speed transmission is to automatically change the winding diameter of the trapezoidal belt around the driving and the driven pulleys in order to have a maximum torque at low speeds and a reasonable engine rotation speed at high speeds. The sides of the trapezoidal belt are, on each pulley, gripped between two opposite flanges wherein one is fixed and one is movable. At low speeds, the winding diameter of the driving pulley is small and the winding diameter of the driven pulley is maximum. As tile rotation speed of the driving pulley increases, the movable flange of the driving pulley gets closer to the fixed flange and thus forces the trapezoidal belt to wind on a greater diameter. Since the length of the trapezoidal belt is not substantially stretchable, the trapezoidal belt exerts a radial force towards the center on the flanges of the driven pulley in addition to the tangential driving force. This radial force constrains the driven pulley to have a smaller winding diameter. Therefore, the movable flange of the driven pulley moves away from the fixed flange until the return force exerted by a spring counterbalances the radial force exerted by the trapezoidal belt. It should be noted at this point that a change in the load also produces a variation of the winding diameter of the pulleys, a greater load inducing a greater winding diameter of the driven pulley.

When the rotation speed of the engine decreases, the winding diameter of the driving pulley decreases and the radial force exerted by the trapezoidal belt decreases, thus allowing the driven pulley to have a greater winding diameter.

An example of such a variable speed transmission is disclosed in U.S. Pat. No. 3,266,330.

One of the drawbacks of conventional variable speed transmissions is that the driven pulley do not always set the trapezoidal belt at the maximum winding diameter when the vehicle is stopped very rapidly from a high speed, especially when an important brake force is applied on the wheels or tracks. The trapezoidal belt will then be stuck somewhere between the high speed position and the initial position. At restart, the ratio between the pulleys will not be optimum and the transmission will not deliver full torque.

The above-mentioned drawback is due to the physical limitations imposed by the use of a spring and cam system in the driven pulley to counterbalance the radial force exerted by the sides of the trapezoidal belt on the flanges. The spring is usually a helicoidal spring and is mounted between the movable flange and a fixed part. The cam is usually mounted around the spring and converts the torque exerted on the movable flange to axial gripping force on the belt.

In an ideal driven pulley, the gripping force on the belt at start is maximum because the belt pull is high to transmit engine torque on a small driver radius. At higher speed, the belt pull is lower and the gripping force must be reduced to maintain good efficiency.

In a conventional driven pulley, the spring and cam system provide a gripping force that reduces as speed increases, as long as the engine supplies power through the transmission. However, during braking, the engine absorbs power through the transmission. This unloads the cam and the gripping force is then supplied mainly by the spring. In this situation, the spring exerts less and less gripping force on the movable flange as it moves closer towards the fixed flange. This low gripping force is usually insufficient to force the belt towards a higher winding diameter during a rapid braking action. To generate enough gripping force, it would require a stronger spring. However, the gripping force would then be too high at high speed, reducing efficiency and increasing belt wear.

SUMMARY OF THE INVENTION

The present invention allows the use of a soft spring while still maintaining a high gripping force at low speed during braking.

The driven pulley according to the invention is used in a variable speed transmission and comprises:
a shaft having two ends;
two coaxial flanges located on the shaft, each flange having an inner conical wall, the inner walls facing each other and providing a V-shaped groove for a trapezoidal pulley belt exerting substantially a radial force and a tangential force on the inner walls, one of the flanges, hereinafter called "fixed flange", being rigidly attached at one end of the shaft, the other flange, hereinafter called "movable flange", being slidably and rotatably mounted on the shaft;
a helicoidal spring, mounted around the shaft, forcing the movable flange to get closer to the fixed flange; and
means for generating an angular displacement of the movable flange with reference to the fixed flange and in function of the distance in-between, the angular displacement being in a direction opposite to the direction of rotation of the pulley.

The object of the present invention is to provide an improvement which consists of:
a substantially conical ring rotatably attached to the movable flange, on a side opposite its inner conical wall, and concentric therewith, the conical ring having an inner edge and an outer edge where the inner edge is farther from the fixed flange than the outer edge;
at least two flyweights, symmetrically disposed around a plate rigidly attached to the shaft, each flyweight being operatively attached to an arm, the arm being operatively attached to the plate and extending therefrom, each of the arm being able to revolve, about a tangential axis disposed at an edge of the plate, between a first position where the corresponding flyweight projects substantially toward and against the annular conical surface of the movable flange and a second position where the corresponding flyweight projects substantially radially with reference to the shaft; and biasing means for forcing the flyweights to rest against the conical ring, the biasing means generating an axial resultant force for moving the movable flange closer to the fixed flange, the force being maximum at the first position.

In use, at minimum rotation speed, the flyweights are at the first position. As rotation speed increases, the flyweights are subjected to a centrifugal force counterbalancing the biasing means, therefore reducing it and moving the flyweights closer to the second position.

According to a preferred embodiment, the flyweights are not in contact with the conical ring when at the second position.

According to another preferred embodiment, the biasing means comprise a pair of torsion springs coaxially mounted around the tangential axis.

According to a still preferred embodiment, the driven pulley further comprises means to have a minimum spacing between the fixed and movable flanges.

A non restrictive description of a preferred embodiment will now be given with reference to the appended drawings.

DESCRIPTION OF A PREFERRED EMBODIMENT

Figure 1:
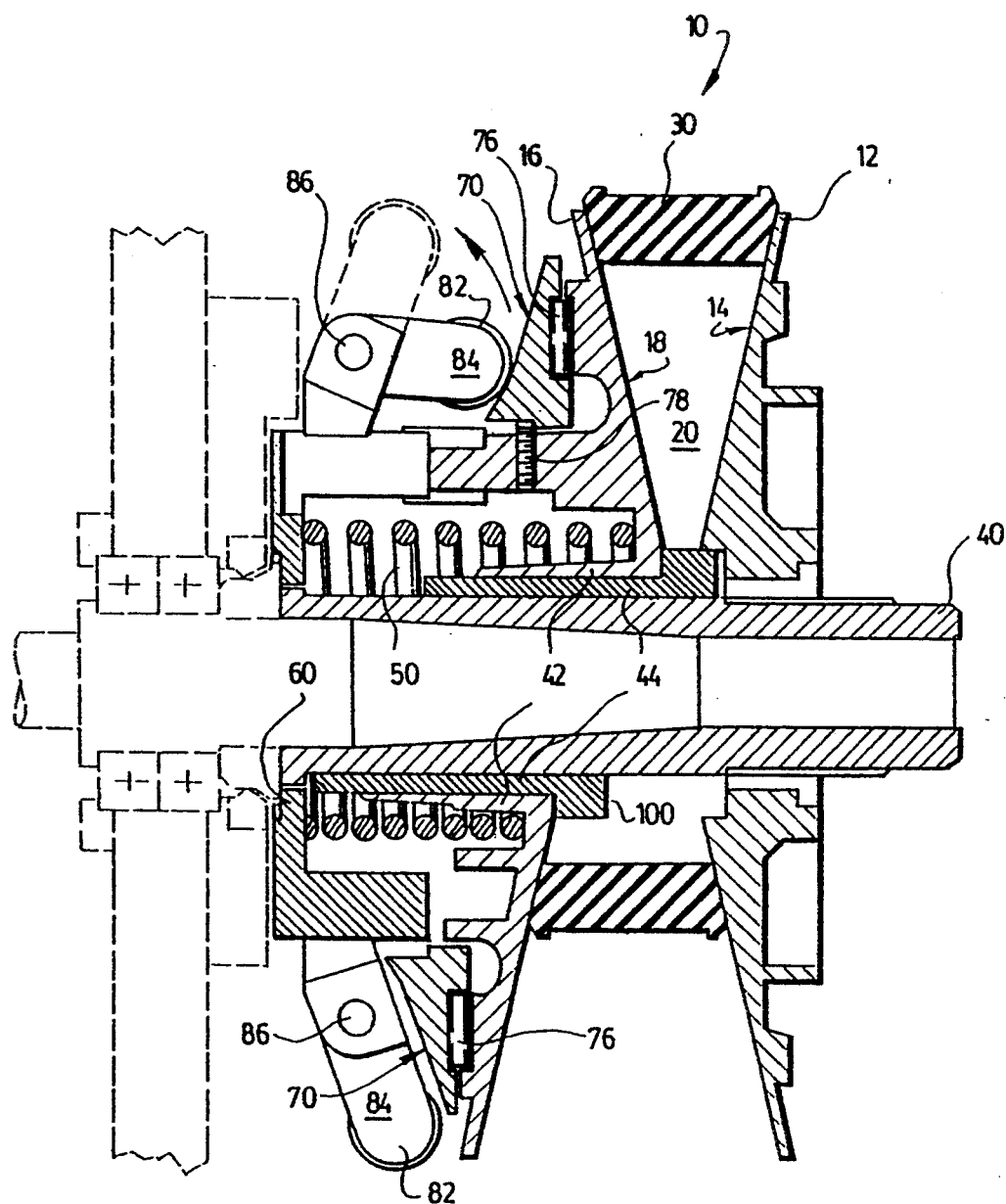
FIG. 1 is a cross sectional view of the driven pulley, according to the invention, with the upper half in a low rotation speed position and the lower half in a high rotation speed position.

With reference to the accompanying drawings, the driven pulley comprise the following numbers:

10: driven pulley
12: fixed flange
14: inner conical wall (fixed flange)
16: movable flange
18: inner conical wall (movable flange)
20: V-shaped groove
30: trapezoidal belt
40: shaft
42: cylinder
44: cylindrical brass
50: helicoidal spring
60: cam plate
62: cam surfaces
64: slider buttons
70: conical ring
72: inner edge
74: outer edge
76: rolls
78: retaining screws
80: flyweight assembly
82: cylindrical flyweight
84: H-shaped arm
86: shaft
88: torsion springs
90: contact surface
100: stopper With reference to the annexed drawings, the invention relates to an improvement in a driven pulley 10 of a variable speed transmission. This pulley 10 comprises:

a shaft 40 having two ends;

two coaxial flanges 12 and 16, both located on the shaft 40, each flange having an inner conical wall, the inner walls facing each other and providing a V-shaped groove for a trapezoidal pulley belt exerting substantially a radial force and a tangential force on the inner walls, one of the flange, hereinafter called "fixed flange", being rigidly attached at one end of the shaft, the other flange, hereinafter called "movable flange", being slidably and rotatably mounted on the shaft;

a helicoidal spring 50, mounted around the shaft 40, forcing the movable flange to get closer to the fixed flange and preferably exerting an axial and a torsional return forces; and means for generating an angular displacement of the movable flange 16 with reference to the fixed flange 12 and in function of the distance in-between, the angular displacement being in a direction opposite to the direction of rotation of the pulley.

The driven pulley 10, as shown in FIG. 1, is one of the parts of a variable speed transmission which substantially comprises a driving pulley (not shown), a trapezoidal belt 30 and the driven pulley 10. The driven pulley 10 comprises a fixed flange 12 having an inner conical wall 14, and a movable flange 16 having an inner conical wall 18. The fixed flange 12 and the movable flange 16 are coaxially mounted. The inner conical walls 14 and 18 are facing each other and define a V-shaped groove 20. A trapezoidal belt 30 is winded around substantially the half of the driven pulley 10, against the inner conical walls 14 and 18. Another portion of the trapezoidal belt 30 is winded around the driving pulley (not shown).

The fixed flange 12 is rigidly attached at one the ends of the shaft 40. The movable flange 16 is slidably and rotatably mounted around the shaft 40 by means of a cylinder 42, located at the back of the movable flange 16 and rigidly attached thereon. The shaft 40 may be mechanically connected to ground traction means (not shown), such as wheels, tracks or any other suitable mechanism. Advantageously, a cylindrical brass 44, located between the shaft 40 and the cylinder 42, may be provided for preventing wear and reducing the friction. Means for providing a minimum spacing between the fixed flange 12 and the movable flange 16, such as a stopper 100, are provided for preventing the trapezoidal belt 30 from getting out of the driven pulley 10. A ring (not shown) of a suitable thickness may also be provided.

This improvement consists of:

a substantially conical ring 70 rotatably attached to the movable flange, on a side opposite its inner conical wall, the conical ring 70 having an inner edge 72 and an outer edge 74 where the inner edge 72 is farther from the fixed flange 12 than the outer edge 74;

at least two flyweights, preferably cylindrical flyweights 82, preferably three, symmetrically disposed around a plate rigidly attached to the shaft, each flyweight 82 being operatively attached to an arm, the arm being operatively attached to the plate and extending therefrom, each of the arm being able to revolve, about a tangential axis disposed at an edge of the plate, between a first position where the corresponding flyweight 82 projects substantially towards and against the annular conical surface 70 of the movable flange 16 and a second position where the corresponding flyweight 82 projects substantially radially with reference to the shaft 40; and biasing means for forcing the flyweights 82 to rest against the conical ring 70, the biasing means having an axial resultant force for moving the movable flange 16 closer to the fixed flange 12, the force being maximum at the first position.

In use, at minimum rotation speed, the flyweights 82 are at the first position. As rotation speed increases, the flyweights 82 are subjected to a centrifugal force counterbalancing the means forcing the flyweights to rest against the conical ring 70, therefore reducing it and moving the flyweights closer to the second position.

Preferably, the conical ring 70 is not having a constant angle. It may be curved or have two or more cone angles, thereby allowing a mechanical behaviour adapted to specific designs.

According to particularly preferred embodiments of the invention, the means to generate angular displacement of the movable flange 16 with respect to the fixed flange 12 may comprise a cam plate 60 rigidly attached on the shaft 40 at the end opposite of the fixed flange 12. A helicoidal spring 50 is coaxially mounted around the shaft 40 between the movable flange 16 and the cam plate 60.

Figure 3:
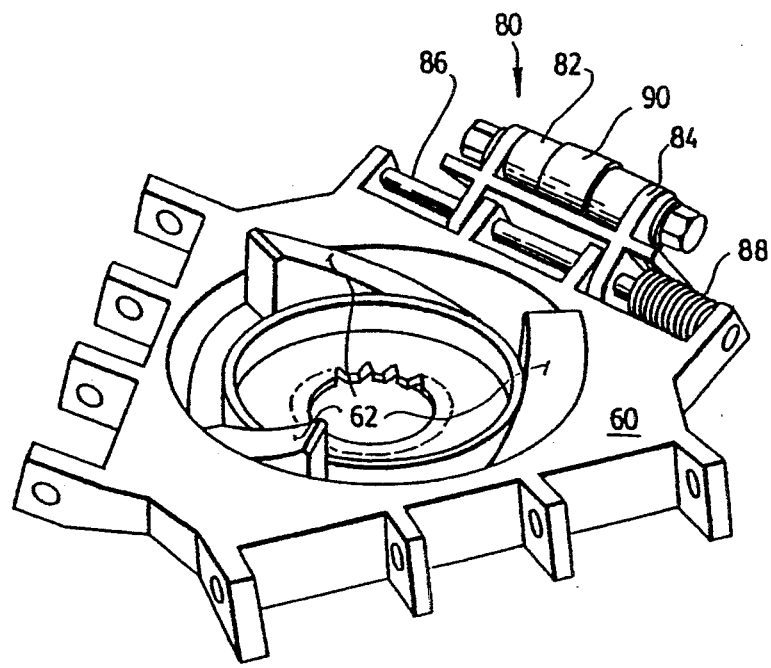
FIG. 3 is a perspective view of the cam plate with only one flyweight partially mounted thereon.

As shown in FIG. 3, the cam plate 60 may have three cam surfaces 62 symmetrically disposed around a circular path. The cam surfaces 62 are curved to follow the circular path and progressively project toward the movable flange 16 in the direction of rotation of the driven pulley 10. It is not essential to have three cam surfaces 62, but two is the minimum number. Additionally, the cam surfaces 62 may have a non-constant ramp angle according to specific design requirements.

Figure 4:
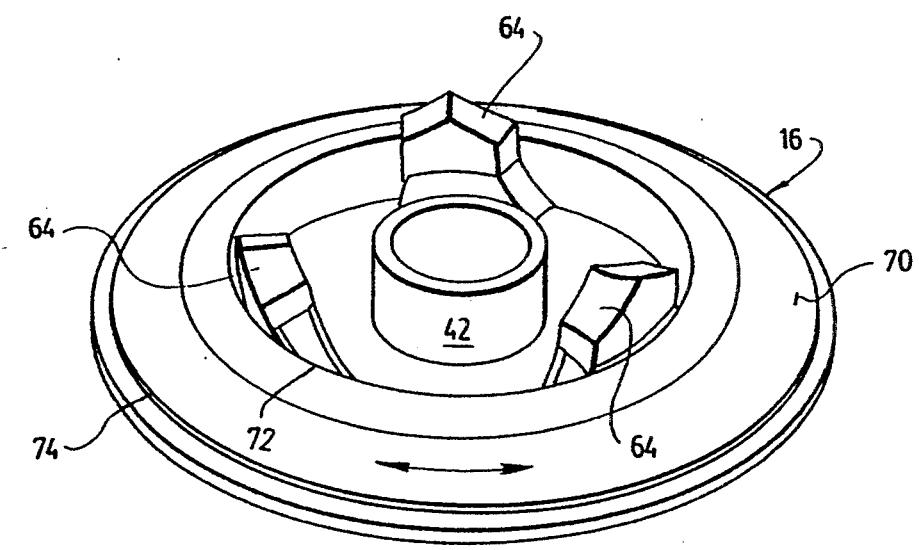
FIG. 4 is a perspective view of the rear of the movable flange.

As shown in FIG. 4, three slider buttons 64 are rigidly attached to the back of the movable flange 16, projecting therefrom towards the cam plate 60. The slider buttons 64 are symmetrically disposed around a circular path substantially similar to the circular path of the cam surfaces 62. The number of slider buttons 64 is equal to the number of cam surfaces 62.

It is possible to have the cam surfaces 62 at the back of the movable flange 16 and the slider buttons 64 on the cam plate 60. It is also possible to have two sets of cam surfaces 62, one at the back of the movable flange 16 and the other on the cam plate 62, with conical rollers set in-between (not shown).

As aforesaid, the driven pulley 10 changes its winding diameter of the trapezoidal belt 30 to keep an optimum ratio between the driving pulley and the driven pulley, thus compensate for the variation of the winding diameter of the driving pulley. The power is transmitted from the driving pulley to the driven pulley 10 by a tangential force generated by the traction on the trapezoidal belt 30. Half of the power is transmitted to the inner conical wall 14 and then to the shaft 40 by means of the fixed flange 12. The other half of the power goes to shaft 40 through the inner conical wall 18, the movable flange 16, the slider buttons 64, the cam surfaces 62 and the cam plate 60.

As the winding diameter of the driving pulley increases, the tension in the trapezoidal belt 30 increases. This tension exerts a radial force, oriented towards the center of the driven pulley 10, on the inner conical walls 14 and 18. It thus force the movable flange 16 to move away from the fixed flange 12. However, the axial force exerted on the movable flange 16 is counterbalanced by the helicoidal spring 50 and an axial component of the tangential force exerted by the trapezoidal belt 30 on the movable flange 16. If the tension in the trapezoidal belt 30 increases, the movable flange 16 is moved away from the fixed flange 12 and the spring 50 is depressed until a new equilibrium between the spring force and the axial force generated by the trapezoidal belt 30. Each time the movable flange 16 moves, the winding diameter changes.

Half of the torque from the trapezoidal belt 30 goes through the inner conical wall 18, the movable flange 16 and the slider buttons 64, which are sliding on the cam surfaces 62, themselves reacting axially on the slider buttons 64, thereby generating an additional gripping force. When the torque is increased, it increases the belt grip and forces the trapezoidal belt to get to a greater winding diameter.

Additionally, the helicoidal spring 50 may exert a torsional return force in addition to the axial return force. In such case, the torsional return force is exerted in the direction of rotation and contributes to reset the flanges 12 and 16 closer to each other.

As also aforesaid, the spring 50 has a mechanical behaviour opposite to what it should be in an ideal driven pulley, which is to allow a maximum gripping force on the trapezoidal belt 30 when the winding diameter is maximum and a minimum gripping force when the winding diameter is minimum. This is due to the fact that the more a spring is depressed, the greater the return force becomes.

Figure 2:
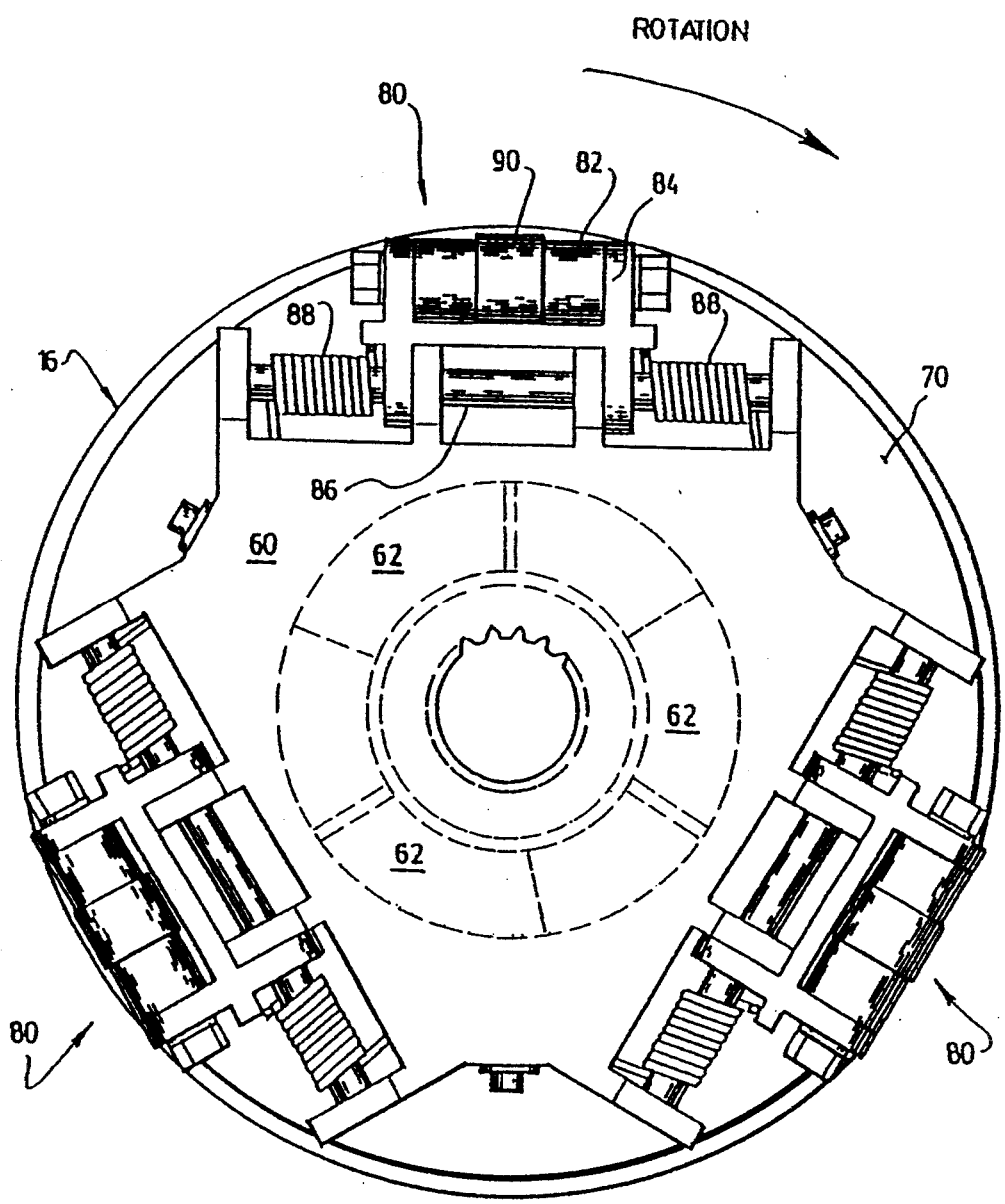
FIG. 2 is a rear elevation view of the cam plate.

To allow a maximum gripping force at low speed, such as when the winding diameter is maximum, an auxiliary device is provided to help the spring 50. As shown in FIG. 2, it comprises a set of three flyweight assemblies 80 symmetrically disposed around the cam plate 60, at the outer edge thereof. It is not essential to have three flyweight assemblies 80 but the minimum number is two for balancing purposes.

Each flyweight assembly 80 has a cylindrical flyweight 82 operatively attached to the cam plate 60 by a H-shaped arm 84, itself operatively attached to the cam plate 60, and extending therefrom, by means of a shaft 86. Two torsion springs 88, coaxially mounted around the shaft 86 and each located at one side of the arm 84, force the flyweight 82 to rest against a conical ring 70 provided at the rear of the movable flange 16, near the outer edge 74 thereof, and facing the cam plate 60. One or more than two torsion springs 88 may also be used.

Referring to FIG. 1, the conical ring 70 is rotatably attached to the movable flange 16 for allowing free relative movement between the movable flange 16 and the flyweights 82 when the movable flange 16 is following the cam surface 62. It thus allows a low friction movement which do not interfere with the normal operation of the pulley. The conical ring 70 is rolling on cylindrical rolls 76 and is maintained is place by screws 78 for preventing it from moving axially. Although balls (not shown) can be used instead of rolls, rolls are preferred because the forces is more evenly distributed.

As shown in FIG. 4, the inner edge 72 is closer to the cam plate 60 than the outer edge 74. To minimize the friction and to have a better contact, each flyweight 82 has a contact surface 90 having a slightly larger diameter and centrally located thereon, as shown in FIGS. 2 and 3.

As shown in FIG. 1, each arm 84 is able to revolve, about a tangential axis disposed at an edge of the cam plate 60, between a first position where the corresponding flyweight 82 projects substantially towards and against the conical ring 70 of the movable flange 16, and a second position where the corresponding flyweight 82 projects substantially radially with reference to the shaft 40. Each flyweight 82 can turn freely on itself around its longitudinal axis.

In use, at low speeds, the flyweights 82 apply a force on the conical ring 70 and force the movable flange 16 to get closer to the fixed flange 12. At high speeds, the flyweights 82 are subjected to a centrifugal force counterbalancing the return force of the torsion springs 88 and therefore the flyweights 82 are brought closer to the second position as rotation speed increases.

At the second position, the flyweights 82 are not in contact with the conical ring 70. However, this is not essential.

Initially, as shown in FIG. 1 at the upper half of the drawing, the H-shaped arm 84 is almost parallel to the shaft 40. The radial force exerted by the trapezoidal belt 30 will then have to be very important to move the flyweights 82 from the first position. But as the rotation speed increases, so does the centrifugal force acting on the flyweights 82 and the movable flange 16 will then be easier to move by the trapezoidal belt 30 despite the return force generated by the torsion springs 88, which exert a force on the arm 84 to get the flyweights 82 to the first position. Yet, as the rotation speed increases, the action of the flyweight 82 is less important, thus exactly as it should be in a ideal driven pulley.

At a certain rotation speed, the flyweights 82 leave the conical ring 70. They reach the second position just after they took off and they remain there until the rotation speed is lower.

With the use of the flyweight assemblies 80, it is now possible to use soft spring and still have a suitable gripping force at low speed. The use of the soft spring 50 also allows to have a reasonably low gripping force at high speeds, therefore better efficiency.

Figure 5:
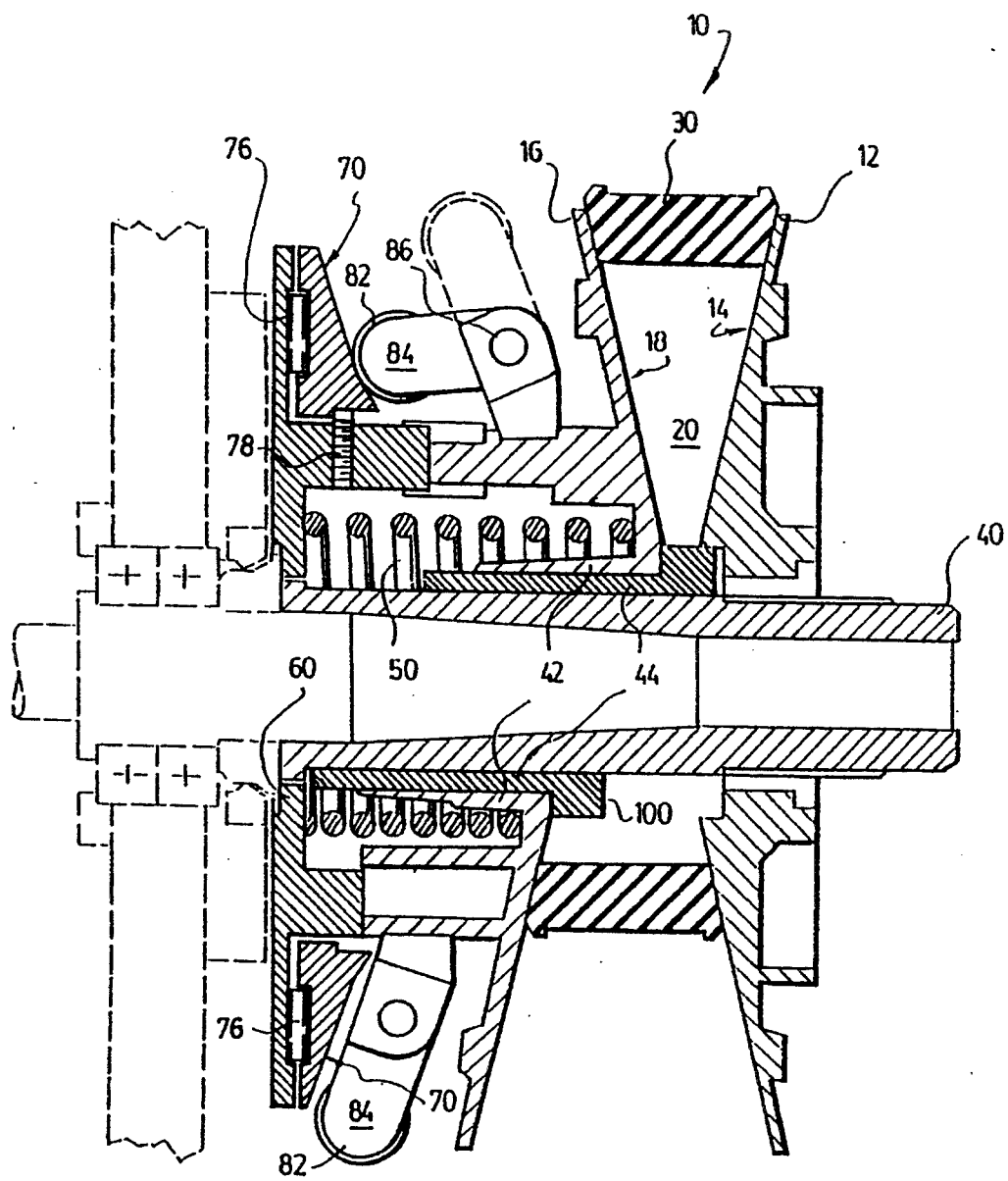
FIG. 5 is a cross-sectional view of the driven pulley according to an alternative design of the invention.

Of course, as shown in FIG. 5, the position of the conical ring 70 and the flyweight assemblies 80 may be inverted.

Although a preferred embodiment of the invention has been described in detail herein and illustrated in the accompanying drawings, it is to be understood that the invention is not limited to this precise embodiment and that various changes and modifications may be effected therein without departing from the scope or spirit of the invention.

What I claim is:

1. In a driven pulley of a variable speed transmission, the pulley comprising:
   a shaft having two ends;
   two coaxial flanges located on the shaft, each flange having an inner conical wall, the inner walls facing each other and defining a V-shaped groove for a trapezoidal pulley belt exerting substantially a radial force and a tangential force on the inner walls, one of the flanges, hereinafter called "fixed flange", being rigidly attached at one end of the shaft, the other flange, hereinafter called "movable flange", being slidably and rotatably mounted on the shaft;
   a helicoidal spring, mounted around the shaft, forcing the movable flange to get closer to the fixed flange; and
   means for generating an angular displacement of the movable flange with reference to the fixed flange and in function of the distance in-between, the angular displacement being in a direction opposite to the direction of rotation of the pulley; the improvement consisting of:
   a substantially conical ring rotatably attached to the movable flange, on a side opposite its inner conical wall, and concentric therewith, the conical ring having an inner edge and an outer edge where the inner edge is farther from the fixed flange than the outer edge;
   at least two flyweights, symmetrically disposed around a plate rigidly attached to the shaft, each flyweight being operatively attached to an arm, the arm being operatively attached to the plate and extending therefrom, each of the arm being able to revolve, about a tangential axis disposed at an edge of the plate, between a first position where the corresponding flyweight projects substantially toward and against the annular conical surface of the movable flange and a second position where the corresponding flyweight projects substantially radially with reference to the shaft; and
   biasing means for forcing the flyweights to rest against the conical ring, the biasing means generating an axial resultant force for moving the movable flange closer to the fixed flange, the force being maximum at the first position;
   whereby, at minimum rotation speed, the flyweights are at the first position, and, as rotation speed increases, the flyweights are subjected to a centrifugal force counterbalancing the biasing means, therefore reducing it and moving the flyweights closer to the second position.

2. In a driven pulley of a variable speed transmission, the pulley comprising:
   a shaft having two ends;
   two coaxial flanges located on the shaft, each flange having an inner conical wall, the inner walls facing each other and defining a V-shaped groove for a trapezoidal pulley belt exerting substantially a radial force and a tangential force on the inner walls, one of the flanges, hereinafter called "fixed flange", being rigidly attached at one end of the shaft, the other flange, hereinafter called "movable flange", being slidably and rotatably mounted on the shaft;
   a helicoidal spring, mounted around the shaft, for forcing the movable flange to get closer to the fixed flange;
   a cam plate rigidly attached to one end of the shaft opposed to the end where the fixed flange is attached, the cam plate having at least two cam surfaces symmetrically disposed around a circular path, the cam surfaces having an end projecting towards the movable flange; and
   slider buttons in number equal to the cam surfaces, rigidly attached to the movable flange and projecting therefrom towards the cam plate, symmetrically disposed around a circular path substantially similar to the circular path of the cam surfaces, the slider buttons being made of a low friction material and having a shape suitable for easily sliding on the cams;
   the improvement comprising:

a substantially conical ring rotatably attached to the movable flange, on a side opposite its inner conical wall, and concentric therewith, the conical ring having an inner edge and an outer edge where the inner edge is closer to the cam plate than the outer edge;

at least two cylindrical flyweights symmetrically disposed around the cam plate, each flyweight being operatively attached to an arm, the arm being operatively attached to the cam plate and extending therefrom, each of the arm being able to revolve, about a tangential axis disposed at an edge of the cam plate, between a first position where the corresponding flyweight projects substantially towards and against the annular conical surface and a second position where the corresponding flyweight projects substantially radially with reference to the shaft; and biasing means for forcing the flyweights to apply a force on the conical ring having an axial resultant force for moving the movable flange closer to the fixed flange, the force being maximum at the first position;

whereby, at minimum rotation speed, the flyweights are at the first position, and, as rotation speed increases, the flyweights are subjected to a centrifugal force counterbalancing the biasing means, therefore moving the flyweights closer to the second position.

3. An improved driven pulley according to claim 2, wherein the flyweights are not in contact with the conical ring when at the second position.

4. An improved driven pulley according to claim 3, wherein their is three cam surfaces.

5. An improved driven pulley according to claim 4, wherein the number of cylindrical rollers is three.

6. An improved driven pulley according to claim 5, wherein the biasing means comprise a pair of torsion springs coaxially mounted around the tangential axis.

7. An improved driven pulley according to claim 2, wherein the helicoidal spring exerts an axial and a torsional return forces.

8. An improved driven pulley according to claim 2, further comprising means for providing a minimum spacing between the fixed and movable flanges.

9. An improved driven pulley according to claim 1, wherein the substantially conical ring is not flat.

10. An improved driven pulley according to claim 2, wherein the substantially conical ring is not flat.

11. In a driven pulley of a variable speed transmission, the pulley comprising:

a shaft having two ends;

two coaxial flanges located on the shaft, each flange having an inner conical wall, the inner walls facing each other and defining a V-shaped groove for a trapezoidal pulley belt exerting substantially a radial force and a tangential force on the inner walls, one of the flanges, hereinafter called "fixed flange", being rigidly attached at one end of the shaft, the other flange, hereinafter called "movable flange", being slidably mounted around the shaft and able to slide and turn thereon;

a helicoidal spring, mounted around the shaft, for forcing the movable flange to get closer to the fixed flange, the helicoidal spring exerting an axial and a torsional return forces;

a cam plate rigidly attached to one end of the shaft opposed to the end where the fixed flange is attached, the cam plate having three cam surfaces symmetrically disposed around a circular path, the cams having an end projecting towards the movable flange;

three slider buttons, rigidly attached to the movable flange and projecting therefrom towards the cam plate, symmetrically disposed around a circular path substantially similar to the circular path of the cams, the slider buttons being made of a low friction material and having a shape suitable for easily sliding on the cams; and means for providing a minimum spacing between the fixed and movable flanges;

the improvement comprising:

a substantially conical ring rotatably attached to the movable flange, on a side opposite its inner conical wall, and concentric therewith, the conical ring having an inner edge and an outer edge where the inner edge is closer to the cam plate than the outer edge, the substantially conical ring being not flat;

three cylindrical flyweights symmetrically disposed around the cam plate, each flyweight being operatively attached to an arm, the arm being operatively attached to the cam plate and extending therefrom, each of the arm being able to revolve, about a tangential axis disposed at an edge of the cam plate, between a first position where the corresponding flyweight projects substantially toward and against the annular conical surface of the movable flange and a second position where the corresponding flyweight projects substantially radially with reference to the shaft; and biasing means for forcing the flyweights towards the first position, the biasing means comprising a pair of torsion springs coaxially mounted around the tangential axis;

whereby, when the driven pulley is in rotation, at low rotation speed, the flyweights apply a force on the conical ring, contributing to force the movable flange to get closer to the fixed flange, and, at higher rotation speed, the flyweights are subjected to a centrifugal force counterbalancing the pair of torsion springs coaxially mounted around the tangential axis, and therefore the flyweights are brought closer to the second position as rotation speed increases, the flyweights being not in contact with the conical ring when at the second position.

12. In a driven pulley of a variable speed transmission, the pulley comprising:

a shaft having two ends;

two coaxial flanges located on the shaft, each flange having an inner conical wall, the inner walls facing each other and defining a V-shaped groove for a trapezoidal pulley belt exerting substantially a radial force and a tangential force on the inner walls, one of the flanges, hereinafter called "fixed flange", being rigidly attached at one end of the shaft, the other flange, hereinafter called "movable flange", being slidably and rotatably mounted on the shaft;

a helicoidal spring, mounted around the shaft, forcing the movable flange to get closer to the fixed flange; and means for generating an angular displacement of the movable flange with reference to the fixed flange and in function of the distance in-between, the angular displacement being in a direction opposite to the direction of rotation of the pulley;

the improvement consisting of:

a substantially conical ring rotatably attached to the movable flange, on a side opposite its inner conical wall, and concentric therewith, the conical ring having an inner edge and an outer edge, the inner edge being farther from the fixed flange than the outer edge;

at least two flyweights, symmetrically disposed around the movable flange on a side opposite to the inner conical wall thereon, each flyweight being operatively attached to an arm, the arm being operatively attached to the movable flange and extending therefrom, each of the arm being able to revolve, about a tangential axis disposed at an edge of the plate, between a first position where the corresponding flyweight projects substantially toward and against the annular conical surface and a second position where the corresponding flyweight projects substantially radially with reference to the shaft; and biasing means for forcing the flyweights to rest against the conical ring, the biasing means generating an axial resultant force for moving the movable flange closer to the fixed flange, the force being maximum at the first position;

whereby, at minimum rotation speed, the flyweights are at the first position, and, as rotation speed increases, the flyweights are subjected to a centrifugal force counterbalancing the biasing means, therefore reducing it and moving the flyweights closer to the second position.

* * * * *